(Model.)
F. G. BIPPUS
FIFTH WHEEL.
No. 316,869. Patented Apr. 28, 1885.
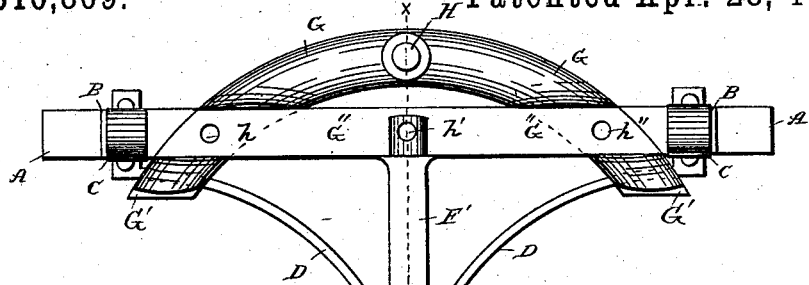
Fig. 1.
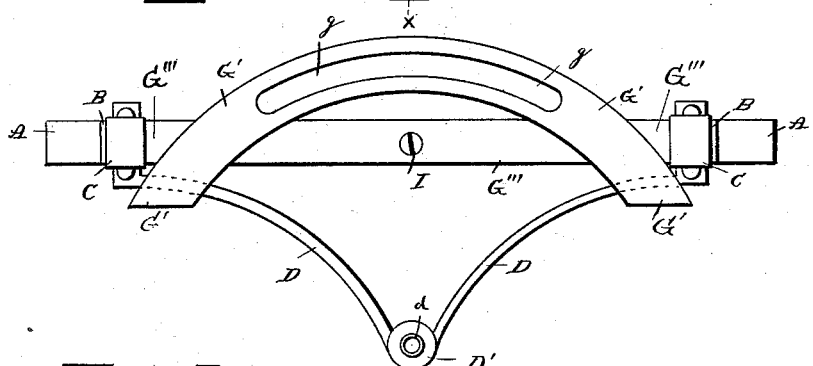
Fig. 2.
Fig. 3.
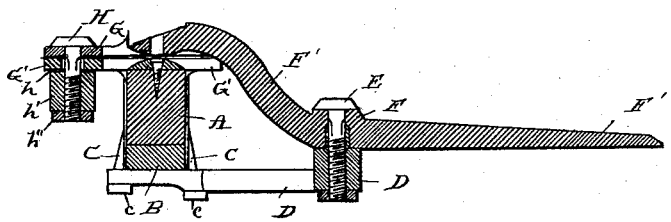
WITNESSES
Edwin S. Bradford
Morton Toulmin
INVENTOR
Ferdinand G. Bippus
W. P. Leonard
*Attorney*

UNITED STATES PATENT OFFICE.

FERDINAND G. BIPPUS, OF EVANSVILLE, INDIANA, ASSIGNOR OF ONE-HALF TO JOHN ALBECKER, OF SAME PLACE.

FIFTH-WHEEL.

SPECIFICATION forming part of Letters Patent No. 316,869, dated April 28, 1885.

Application filed November 14, 1884. (Model.)

*To all whom it may concern:*

Be it known that I, FERDINAND GOTTLIEB BIPPUS, a citizen of the United States, residing at Evansville, in the county of Vanderburg and State of Indiana, have invented certain new and useful Improvements in Fifth-Wheels, of which the following is a specification, reference being had therein to the accompanying drawings.

This invention relates to improvements in fifth-wheels, and has for its object to furnish a stronger and lighter construction than heretofore employed for this purpose. This object is attained by the mechanism illustrated in the accompanying drawings, forming a part of this specification, in which—

Figure 1 is a plan. Fig. 2 is a view taken from the top, in which a part of the fifth-wheel and perch has been removed. Fig. 3 is a sectional view on the line $x$ $x$ of Fig. 1.

The letter A indicates the bolster, B the axle, C the clips, D the hounds, which is formed of a single piece of metal, which is secured to the axle by means of the clips C and nuts $c$, and is provided with a boss, D', having an opening, $d$, for the passage of the king-bolt E, which also passes through an opening in a boss, F, on the perch F', and thus connects the hounds and the perch to each other.

The fifth-wheel is composed of two parts, the upper of which consists of a segment, G, having chord G'' and perch F', the whole being formed of a single piece of metal. The segment G has an opening for the passage of a bolt, H, which extends downwardly through a curved slot, $g$, in a lower segment, G', thus connecting the upper and lower parts of the fifth-wheel together, and at the same time allowing them to slide freely over each other. The chord G'' has openings $h$ $h'$ $h''$, and forms the means of connecting the perch F' and the segment G to each other. The perch F' is enlarged into a boss, F, which is provided with an opening for the passage of a king-bolt, E. This boss is placed at a considerable distance in the rear of the front axle of the vehicle, as a king-bolt placed in this position enables the vehicle to be turned on a shorter radius than if through the axle in the ordinary manner.

The bolt H is provided with a washer of metal, $h$, and also a washer of rubber or other elastic material, $h'$, the whole secured by the nut $h''$.

The lower part of the fifth-wheel is composed of a single piece of metal, the portion G' being of a regular curved form or segment and provided with a curved slot, $g$, and the part G''' is straight or forms a chord to said segment G', the ends of which, G''', extend a little beyond the segment G', and is secured to the bolster A and axle B by means of the clips C and bolt or screw I. As the perch F' and upper part of the fifth-wheel G are composed of a single piece of metal, this construction is found to be exceedingly strong for a given weight of material. The elastic nature of the washer $h'$ permits of some flexibility to the joint between the upper and lower parts of the fifth-wheel.

Having described my invention, what I desire to secure by Letters Patent, and claim, is—

1. A fifth-wheel for vehicles, consisting of a segment, G, having a chord, G'', and perch F', the whole being formed of a single piece of metal, said perch having a boss, F, on its upper side, provided with a central opening for the passage of king-bolt E, the said segment G having an aperture for the passage of bolt H, the segment G' having a curved slot, $g$, and chord G''', extending beyond the periphery of said segment G', in combination with removable bolt H, having washer $h$, elastic cushion $h'$, and nut $h''$, as described, and for the purposes set forth.

2. A fifth-wheel for vehicles, consisting of a segment, G', provided with a chord, G''', having ends extending beyond the periphery of said segment and provided with a curved slot, $g$, the perch F' having a boss, F, on the upper side, said perch being curved upwardly and forming a portion of the chord G'' and of segment G, the whole being composed of a single casting or piece of metal, said segment G having an aperture for the passage of bolt H, in combination with removable cushioned bolt H, king-bolt d, and curved brace D, having a boss, D', on its upper side, composed of a single piece of metal having ends provided with lugs with openings for the passage of the clips C, whereby said brace may be securely attached to the axle of the vehicle, substantially as shown and described and for the purposes set forth.

In testimony whereof I affix my signature in presence of two witnesses.

FERDINAND G. BIPPUS.

Witnesses:
 TOM B. ROSS,
 G. W. DANNETTELL.